Feb. 20, 1945.          C. DANGELMAJER                2,369,661
         MEANS FOR TESTING RESISTANCE TO RUN AND TEAR FORMATION
                        Filed Oct. 14, 1942
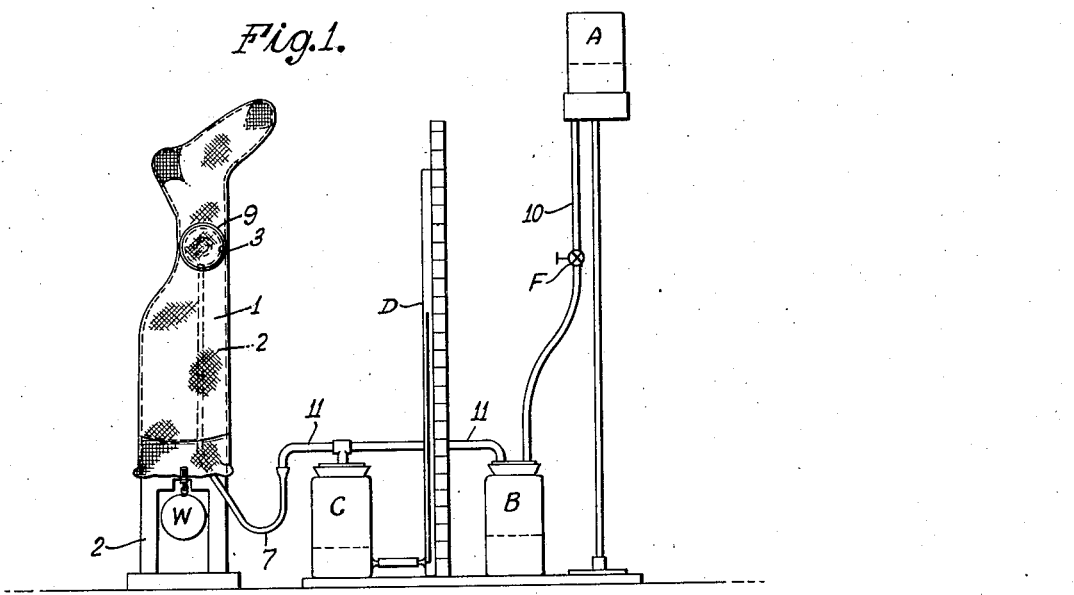
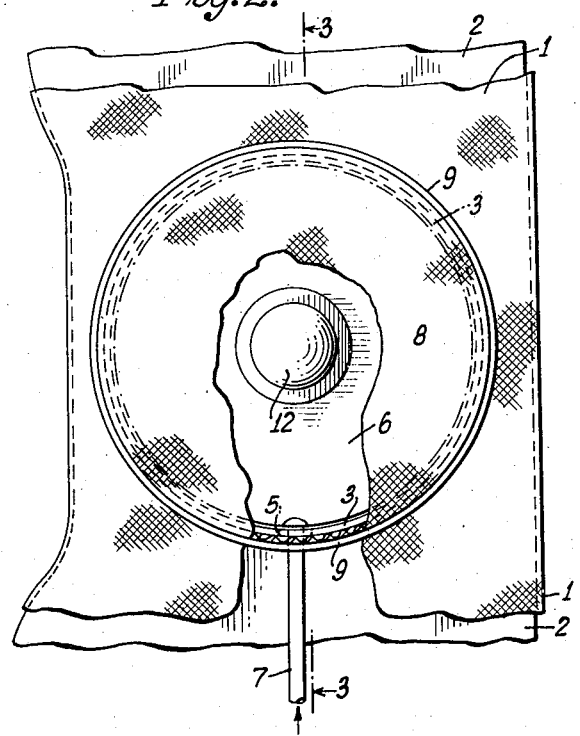
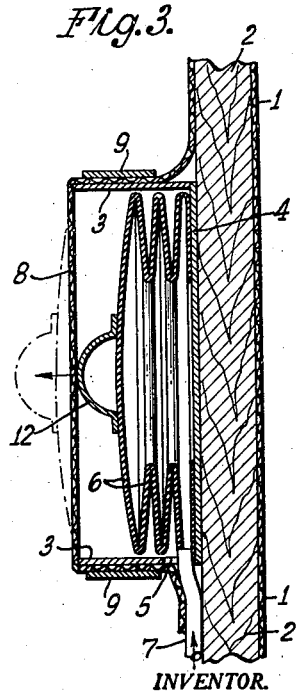
INVENTOR.
CHARLES DANGELMAJER Patented Feb. 20, 1945

2,369,661

UNITED STATES PATENT OFFICE 2,369,661

MEANS FOR TESTING RESISTANCE TO RUN AND TEAR FORMATION

Charles Dangelmajer, Nutley, N. J.

Application October 14, 1942, Serial No. 461,940

2 Claims. (Cl. 73—159)

This invention relates to a device for testing the resistance of fabrics to run formation and has particular relation to a device for testing the resistance of stockings and other knitted articles to run formation. The invention also relates to the testing of tear formation in continuous sheets consisting f. e. of Cellophane or paper.

The main object of this invention is to provide a device for direct measuring of run or tear formation under predetermined conditions to which the material to be examined is subjected during testing.

Another object of this invention is to provide a device by which the material to be tested may be subjected to predetermined and adjustable conditions causing increasing run or tear formation in accordance with the conditions applied to said material.

A further object of this invention is to provide a device for direct measuring of relative resistance to run and tear formation of various materials under substantially predetermined conditions.

Other objects and advantages will appear to those skilled in the art from the following specification and drawing which show, by way of example, a preferred embodiment of my invention, and in which Fig. 1 represents a diagrammatical view of a device adapted to be used for carrying out my invention;

Fig. 2 is a top view of a detail of the testing device, and

Fig. 3 is a sectional view along line 3—3 of Fig. 2.

The resistance of fabrics, knitted articles and other sheet materials to run and tear formation can not be directly measured by the methods and devices hitherto known. The testing of snag resistance of knitted articles is an indirect method based on the experience that the threads usually break at a snag which, therefore, facilitates run formation.

Run formation in knitted articles requires the presence of a broken thread in the fabric and also the action of a force or forces putting the fabric under a certain tension. If such force acts only parallel to the direction of knitting or only at an angle of about 90° to this direction, no run formation takes place. A force or stretching effect, which acts simultaneously in both directions, is necessary for causing run formation.

I have found that run formation in knitted articles, such as stockings, can be directly tested by producing a broken thread in the article, subjecting said article to predetermined and varying stretching conditions acting in the direction of knitting and also in a direction forming an angle of about 90° with the direction of knitting, and measuring the length of the run formed under said varying conditions. The amount of the stretching force necessary for causing a certain run formation represents the comparative degree of resistance to run formation.

Referring now to the drawing, particularly Figure 1, the stocking 1 to be tested is pulled on a standard board 2 and stretched on the board by a weight W applied in a manner similar to that used in testing the snag resistance. A metal cylinder 3 of the design shown in Fig. 3 is then introduced into the space between the standard board 2 and stocking 1. This metal cylinder may have f. e. a diameter of 3" and a height of 1". One end of cylinder 3 is open while its other end is closed by a circular metal plate 4 soldered to the cylinder. The cylinder wall has a hole 5 of f. e. ¼". An inflatable body 6, which is preferably made of rubber or an equivalent material and loosely fits into cylinder 3, is placed in this cylinder. The inflatable body 6 is connected with a flexible tube 7 extending through hole 5 and through this tube body 6 may be filled with air or another gas and thus caused to expand.

A circular portion 8 of stocking 1 lying over the end of cylinder 3 in the position shown in Fig. 1, is now clamped by a tightly fitting ring 9 to the outer surface of cylinder 3 in such a manner that the open end of the cylinder is covered by a plane, circular section of the stocking which is now under a predetermined degree of tension. The fastening of the stocking to cylinder 3 may be carried out in the same way as in the known snag resistance test. The center of circular section 8 is now marked, one thread in the center is pulled out slightly with a needle and cut. The hole formed by cutting the thread is enlarged to about ⅛" diameter and then this section of the stocking is ready for testing.

In order to carry out this test, the air may be forced out from container B by water introduced into B from container A through flexible tube 10. The flow of water is regulated by pinch cock F. The air forced from container B through container C and tubes 11 enters the inflatable body 6 through tube 7, it inflates body 6, which in inflated condition exerts pressure on section 8 of the stocking, whereupon, at sufficient pressure, run formation occurs. The pressure is measured by the level difference of water in C and tube D connected with C. By introducing more air into and thus increasing the pressure in body 6, the stretching to which section 8 of the stocking is subjected, can be increased, and the length of run formation in individual stockings up and down from the center of section 8 under varying pressures, can be measured. The greater the resistance to run formation of a stocking is, the smaller the length of run formation under equal conditions will be. Thus, the lengths of run formation measured under equal conditions but in various stockings will indicate the resistance to run formation of the respective stocking.

It is, of course, preferable to test several different sections of the same stocking in order to obtain correct average values.

In addition to the quality of the stocking, the results obtained in the above described manner are affected by the quality of the material used for making the inflatable body, by the dimensions of the cylinder and other details of construction and also by the atmospheric conditions under which testing is carried out.

A metal ring with springs, as used in the testing of snag resistance, or a clamp is suitable for holding section 8 tightly on cylinder 3. The inflatable body and the flexible tubes may be made of rubber or synthetic plastics of equivalent properties.

In order to reduce the friction between stocking section 8 and the surface of inflatable body 6, and to keep this friction at a low, constant value, I prefer the use of a semisphere 12, fastened to the surface of body 6 at the center of the same as shown in Figs. 2 and 3. This element 12 is preferably made of chromium plated metal (mirror finished) or a hard smooth plastic. The use of such semisphere or an equivalent curved surface facilitates the obtaining of uniform testing conditions and results.

In testing resistance to tear formation of continuous coated or uncoated sheet material, such as Cellophane, plastic films or paper, testing is carried out by placing and clamping a circular section of the material substantially in the above described manner, making a cut in the desired direction in the center of the stretched section and then exerting pressure thereon by inflating body 6 and measuring the length of the tear formed at various pressures.

The stretching effect exerted in the above described manner on the circular section of the material to be tested may also be obtained by means other than those above described. For example, cylinder 3 may house a hollow piston having a suitable convex end surface and adapted to be slowly moved in the cylinder toward the enclosed section of the material tested in order to exert the desired pressure on the same. According to another modification, the stretching effect on the clamped section may be brought about by placing on said section a ball-shaped body of suitable weight. Under the weight of this body carried by said section, the material to be tested will be stretched and this stretching effect may be increased by increasing the weight of the ball-shaped body in a suitable manner, i. e. by putting various weights on the same.

Thus, it will be understood that numerous modifications may be made in the construction of my device without departing from the spirit of my invention. These modifications may be made in details of construction and the materials used for constructing my device and they may depend on the nature of the materials to be tested and/or the specific conditions desired in the examination of these materials.

I claim:

1. A device for direct testing of the resistance to run formation of stockings, said device comprising a board for supporting the stocking and means for keeping it in stretched condition, means for confining a circular section of the stretched stocking, said confining means being situated between said board and the stocking, said confined circular section being provided with a broken thread in its center, an inflatable body arranged within said confining means and adapted to exert varying predetermined stretching effects on said confined section when inflated, a contact between the inflatable body and the confined section being formed on the surface of a smooth curved element secured to a surface of the inflatable body, means for inflating said body, said stretching effects producing run formations of correspondingly varying lengths in said confined section.

2. A device for direct testing of the resistance to run formation of fabrics, said device comprising means for supporting the fabric, means for keeping it in a stretched condition, means for confining a circular section of the stretched fabric, said confined circular section being provided with a broken thread in its center, and an expandible body arranged between said means and the fabric within said confining means and adapted to exert varying predetermined stretching effects on said confined section when expanded, said stretching effects producing run formation of varying lengths in said confined section.

CHARLES DANGELMAJER.